(12) United States Patent
Hara et al.

(10) Patent No.: US 6,966,803 B2
(45) Date of Patent: Nov. 22, 2005

(54) CONTROL APPARATUS FOR HYBRID VEHICLE

(75) Inventors: Kazuhiro Hara, Kawachi-gun (JP);
Manabu Niki, Utsunomiya (JP); Kohei Hanada, Utsunomiya (JP); Koichiro Takemasa, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 10/892,107

(22) Filed: Jul. 16, 2004

(65) Prior Publication Data

US 2005/0014602 A1 Jan. 20, 2005

(30) Foreign Application Priority Data

Jul. 18, 2003 (JP) ..................................... 2003-199272

(51) Int. Cl.⁷ .............................................. B60L 11/02
(52) U.S. Cl. ........................ 440/6; 318/139; 180/65.2; 701/21; 701/22
(58) Field of Search ............................ 440/6; 318/139; 180/65.1, 65.2, 65.4; 701/21, 22

(56) References Cited

U.S. PATENT DOCUMENTS

| | | | | |
|---|---|---|---|---|
| 5,689,955 A | * | 11/1997 | Hauser et al. ................. | 60/442 |
| 5,924,505 A | * | 7/1999 | Theurillat et al. ......... | 180/65.4 |
| 6,013,992 A | * | 1/2000 | Ishikawa et al. ............ | 318/376 |
| 6,223,106 B1 | * | 4/2001 | Yano et al. .................... | 701/22 |
| 6,356,818 B1 | * | 3/2002 | Wakashiro et al. ........... | 701/22 |
| 6,369,531 B1 | * | 4/2002 | Oshima et al. ............. | 318/139 |

FOREIGN PATENT DOCUMENTS

| | | |
|---|---|---|
| JP | 9-14009 | 1/1997 |
| JP | 10-4608 | 1/1998 |

* cited by examiner

*Primary Examiner*—Stephen Avila
(74) *Attorney, Agent, or Firm*—Arent Fox PLLC

(57) ABSTRACT

In a control device of a hybrid vehicle provided with an engine and a propulsion motor, at least one of which is used for driving the hybrid vehicle and a high voltage battery which power is charged and discharged by driving or regeneration operation of a propulsion motor, the control device comprises a throttle opening control device which controls an opening of a throttle depending on an accelerator pedal operating amount, and when the current driving speed of the vehicle at zero, and either the temperature of the high voltage battery is lower than a specified value, or the internal resistance of the high voltage battery is greater than a specified value, or an increase in a rotation speed of the propulsion motor or the rotation speed of the engine 3 is greater than a specified value, or a change amount of the input/output power voltage of the high voltage battery is greater than a specified value, or a change amount of the accelerator pedal operating amount is greater than a specified value, delays the response characteristic of the throttle opening with respect to the accelerator pedal operating amount more than for a standard control, and also performs control in which the upper limit value thereof is limited.

1 Claim, 4 Drawing Sheets

CONTROL APPARATUS FOR HYBRID VEHICLE

CROSS-REFERENCE

Priority is claimed to Japanese application No. 2003-199272, filed Jul. 18, 2003, which is incorporated herein by reference.

BACKGROUND OF THE INVENTION

1. Field of the Invention

The present invention relates to a control apparatus for a hybrid vehicle which can travel by the driving force of at least one of an engine and a propulsion motor.

2. Description of Related Art

Heretofore, for a hybrid vehicle which can travel by the driving force of at least one of an engine and a propulsion motor there exists one in which there is provided a motor electronic control unit to control the propulsion motor, and an engine electronic control unit to control the engine, and a DBW (Drive By Wire) control technique is adopted to electrically control the opening of the engine throttle by means of the engine electronic control unit which controls a throttle actuator. (For example, see Japanese Unexamined Patent Application, First Publication No. Hei 10-4608).

On the other hand, there exists a vehicle provided with a generator which is driven by engine rotation to generate power and charge a storage device (battery) which supplies power to an electrical load installed in the vehicle, in which there is provided an engine rotation speed fluctuation prevention device, which is able to prevent an increases in engine rotation speed in cases where an amount of power generated by the generator is set to zero so as to not overcharge the storage device, and in cases where an increase in engine rotation speed is caused as a result of fluctuations in the engine load. This apparatus detects a decreasing change in the generator current flowing from the generator to the storage device, and in the case where the decreasing change is low, effects operation of an intake air quantity correction device which corrects the intake air quantity of the engine, and in the case where the decreasing change is moderate, effects operation of an ignition control section which corrects the ignition, and in the case where the decreasing change is high, effects operation of a fuel cut which instructs fuel injection to cease. (For example, Japanese Unexamined Patent Application, First Publication No. Hei 09-14009.)

However, with the conventional technique, such as the above, in which the current value flowing to the storage device is detected by a current sensor, and control is performed by controlling the intake air amount to the engine, the engine ignition, and the engine fuel injection amount, and the like, in order to prevent fluctuations in engine rotation speed caused by fluctuations in the engine load, there has been a problem of the possibility of charging being more than is necessary, in the case where the engine rotation speed increases abruptly due to abrupt operation of the accelerator and as a result storage current has flowed from the generator and the propulsion motor to the storage device, for example in a storage device such as a battery where the lower the temperature, the greater the internal resistance.

SUMMARY OF THE INVENTION

The present invention takes the above situation into consideration, with the object of providing a control apparatus for a hybrid vehicle which prevents overcharging of the storage device.

In order to solve the above problem, in a control apparatus for a hybrid vehicle the hybrid vehicle is driven at least one of an engine (for example, the engine 3 in the embodiment) and a propulsion motor (for example, the propulsion motor 1 in the embodiment) and the hybrid vehicle comprises a power storage device (for example, the high voltage battery 6 in the embodiment) which supplies electric power for driving the propulsion motor and which is charged by electric power generated by a regeneration operation of the propulsion motor, the control device of the hybrid vehicle comprises a throttle opening control device (for example, the ECU 13 of the embodiment) which electrically controls an opening of a throttle depending on an operation amount (for example, the accelerator pedal operating amount Ap in the embodiment) of a throttle operating device, the throttle opening control device delays the responsiveness of the throttle opening with respect to an operating amount of the throttle operating device, in a case where the travelling speed of the hybrid vehicle is lower than a specified value, and at least one of a temperature of the storage device, an internal resistance of the storage device, an output voltage of the storage device, a rotating speed of the engine or of the propulsion motor, and an operation change of the throttle operating device, is lower than a specified condition.

A control apparatus for a hybrid vehicle provided with the above construction, by delaying the responsiveness of the throttle opening with respect to the operation amount of the throttle operating device, in the case where the vehicle is travelling at a speed lower than a specified value, and at least one of the temperature of the storage device, the internal resistance of the storage device, the output voltage of the storage device, the rotating speed of the engine or of the propulsion motor, and the operation change of the throttle operating means, is lower than a specified condition, it is possible to suppress an abrupt increase in engine rotation speed caused by abrupt operation of the throttle operating device.

DETAILED DESCRIPTION OF THE INVENTION

Hereunder an embodiment of the present invention will be described with reference to the drawings.
(Overall Construction)

Figure 1:
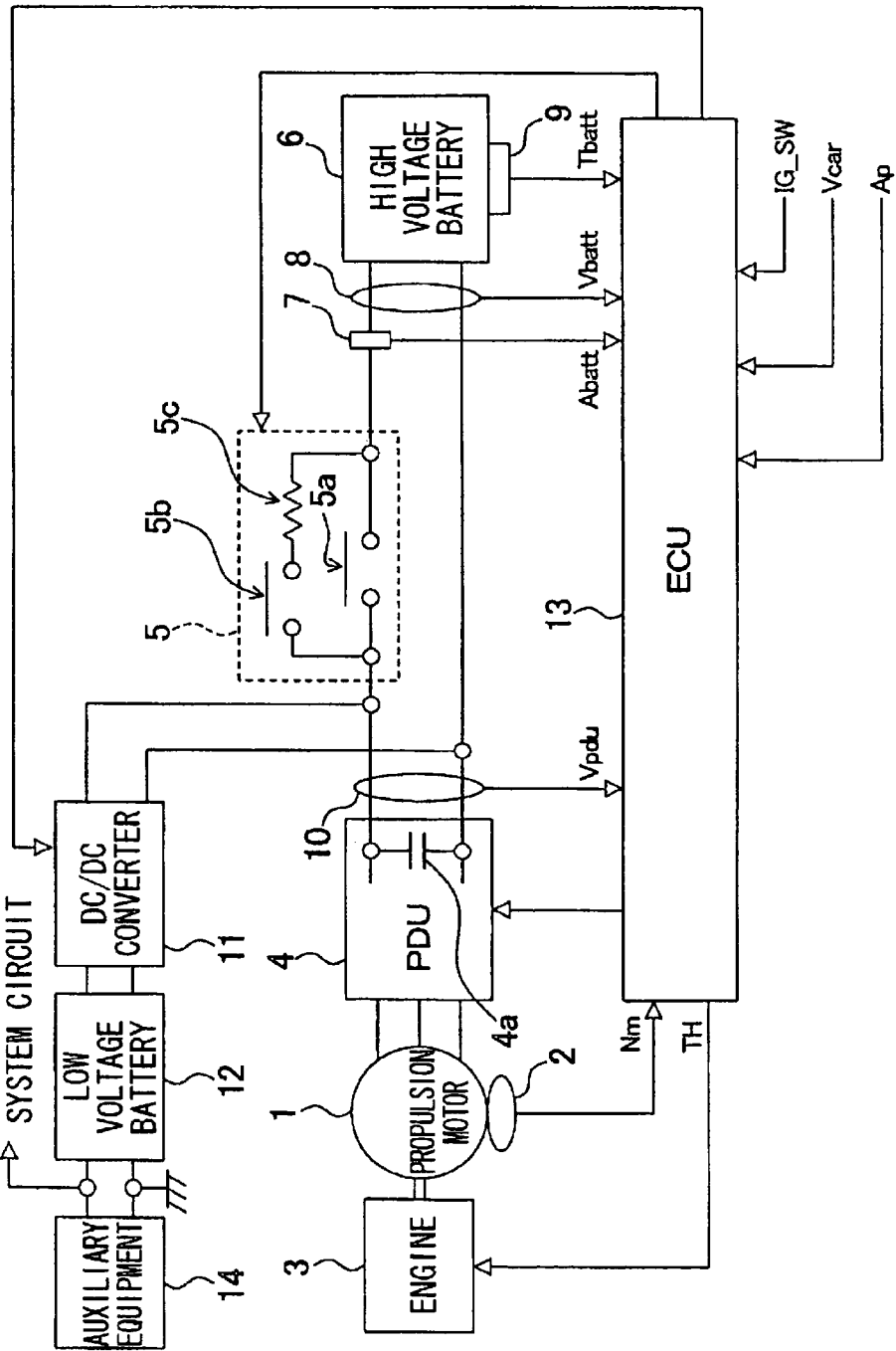
FIG. 1 is a block diagram showing the construction of a control apparatus for a hybrid vehicle according to a first embodiment of the present invention.

FIG. 1 is a block diagram showing the construction of a control apparatus for a hybrid vehicle according to an embodiment of the present invention. In FIG. 1, a propulsion motor 1 which is a three-phase motor, is mounted in a vehicle and either assists an engine 3 which drives the vehicle, or has a rotor thereof connected to the engine 3 of the vehicle so as to drive the vehicle, so that independent motor drive propulsion by the propulsion motor 1, or assisted drive which assists the driving force by means of the propulsion motor 1 when driving by the engine 3, is possible. Furthermore, the engine 3 is provided with a throttle actuator so that DBW (Drive By Wire) control which electrically controls the throttle opening of the engine 3 can be performed.

The propulsion motor 1 is provided with a rotation sensor 2 which is provided with, for example, a resolver or the like, to measure the engine rotation speed Nm of the propulsion motor 1 and output a rotation angle of the rotor of the propulsion motor 1 as a voltage change, and is connected to a power drive unit 4 (hereafter referred to as a PDU) serving as a motor control section constructed mainly from an inverter circuit. The PDU 4 is provided with a smoothing capacitor 4a to stabilize the power voltage, and the smoothing capacitor 4a is connected to a high voltage battery 6 (storage battery) installed in the vehicle, via a main contactor device 5. Here, a 144V battery for example may be used as the high voltage battery 6.

The PDU 4, in a state where the main contactor device 5 is conducting, obtains DC power from the high voltage battery 6 and converts the DC power into three-phase AC power to drive the propulsion motor 1, and on the other hand, charges the high voltage battery 6 by converting the regenerative power of the propulsion motor 1 into DC power. Also, a current sensor 7 and a voltage sensor 8 are connected to the high voltage battery 6, and the residual charge SOC of the high voltage battery 6 can be deduced from an input/output power current Abatt of the high voltage battery 6 detected by the current sensor 7, and an input/output power voltage Vbatt of the high voltage battery 6 detected by the voltage sensor 8, based on the I-V (current-voltage) properties of the high voltage battery 6 and the electric current integrated value. Moreover, a temperature sensor 9 is provided in the high voltage battery 6, and the state of the internal resistance of the high voltage battery 6 can be deduced from a temperature Tbatt of the high voltage battery 6 detected by the temperature sensor 9.

On the other hand, the main contactor device 5 is provided with a main contactor 5a, which is an opening and closing device such as a relay, a contactor, a switch or the like, which is able to interrupt between terminals due to provision of a mechanism which can automatically open and close the circuit; and a pre-charge contactor 5b which is a similar kind of opening and closing device and a pre-charge resistor 5c provided in parallel with the main contactor 5a. As a result, when connecting the PDU 4 and the high voltage battery 6 via the main contactor device 5, at first, the pre-charge contactor 5b is operated (conducts), and then after pre-charging the smoothing capacitor 4a of the PDU 4 the main contactor 5a is operated (conducts). Hence it is possible to prevent damage to the contactor caused by an inrush current towards the smoothing capacitor 4a. Also, a voltage sensor 10 is connected to the smoothing capacitor 4a, and the operation timing of the main contactor 5a can be regulated depending on a voltage value Vpdu detected by the voltage sensor 10.

A DC/DC converter 11 is connected to the high voltage battery 6, and the DC/DC converter 11 charges the low voltage battery 12 by reducing the high voltage DC power obtained from the high voltage battery 6 to a low voltage DC power. Also, low voltage DC power (for example 14.5 V) is supplied from this low voltage battery 12 to an electronic control unit 13 (hereafter referred to as an ECU), which is the control part of the control apparatus for a hybrid vehicle according to the embodiment of the present invention and will be described subsequently, and to a low voltage circuit (for example a 12 V circuit) of auxiliary equipment 14 and the like of the low voltage drive.

Each of the output signals of the engine rotation speed sensor 2, the current sensor 7, the voltage sensor 8, the temperature sensor 9, and the voltage sensor 10 are input to the ECU 13. The ECU 13 executes a zero power control at the battery terminals, which controls the PDU 4 and the DC/DC converter 1 so that the average value of the input/output current Abatt of the high voltage battery 6 detected by the current sensor 7 is zero, that is, so that the current output from the high voltage battery 6 and the current input to the high voltage battery 6 are balanced.

A vehicle ignition switch ON/OFF signal IG_SW, a vehicle speed signal Vcar from the vehicle speed sensor which detects the driving speed of the vehicle, and an accelerator pedal operating amount Ap which shows the accelerator pedal operating amount for regulating the throttle opening of the engine 3, are input to the ECU 13. On the other hand, the ECU 13 outputs respective control signals to the main contactor device 5, the PDU 4, and the DC/DC converter 11. Also, the ECU 13 instructs the throttle opening TH for the throttle actuator of the engine 3 by means of DBW (Drive By Wire) control.

In the case where the propulsion motor 1 is directly connected to the output shaft of the engine 3, the motor rotation speed corresponds to the rotation speed of the engine 3. Therefore it is possible to substitute the rotation speed Nm of the propulsion motor 1 for the rotation speed Ne of the engine 3.

(Battery Protection Operation)

Figure 2:
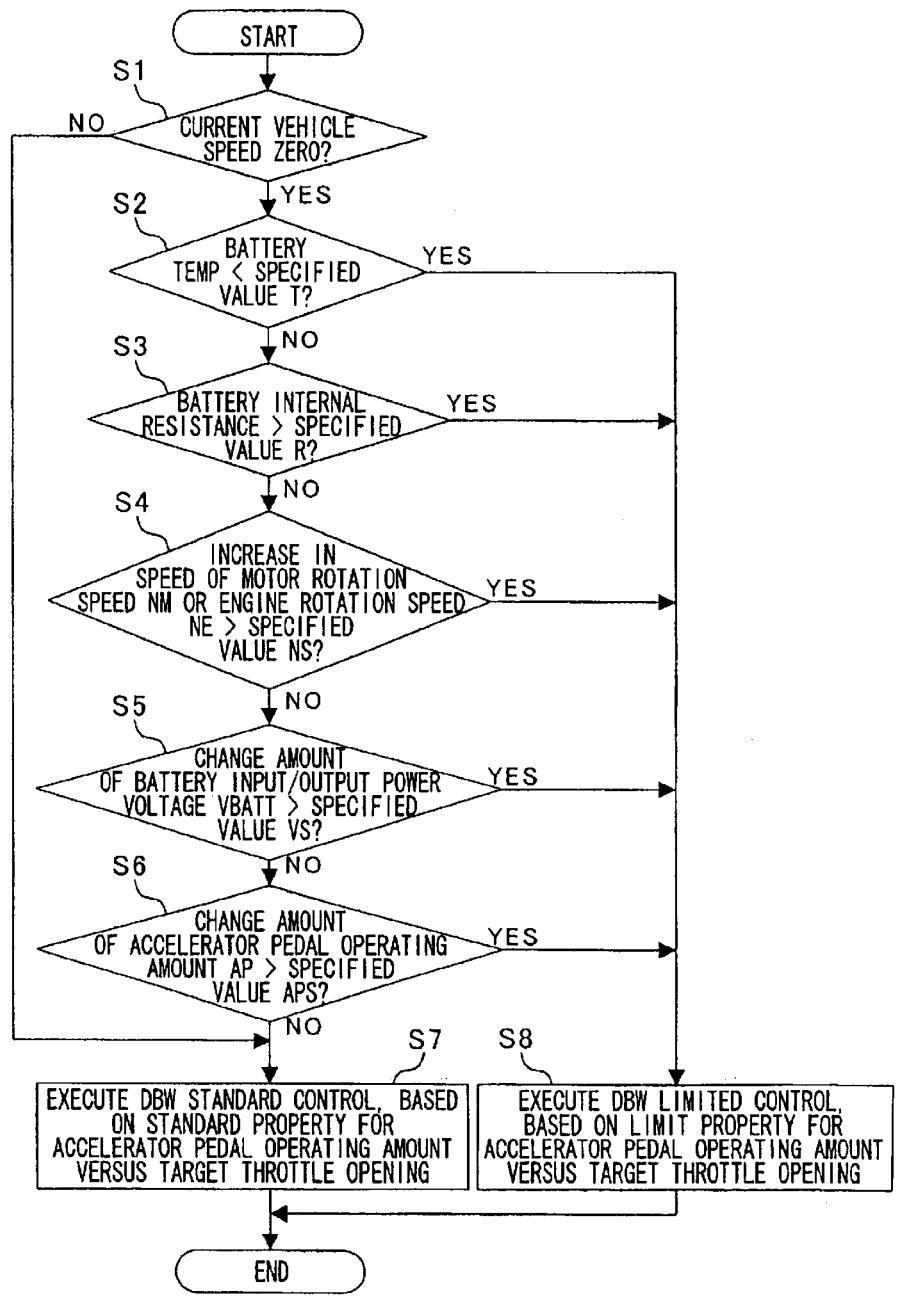
FIG. 2 is a flow chart showing a battery protection operation by means of the control apparatus for a hybrid vehicle of the same embodiment.

Next, a battery protection operation by means of the ECU 13 described above will be described with reference to the drawings. FIG. 2 is a flow chart showing the battery protection operation by means of the ECU 13 of the control apparatus for a hybrid vehicle according to an embodiment of the present invention.

In FIG. 2, firstly, the ECU 13 determines whether or not the current driving speed of the vehicle (vehicle speed) is zero (whether or not the vehicle is stationary) (Step S1).

In step S1, in the case where the current driving speed of the vehicle is zero (Step S1 is YES), the ECU 13 then determines whether or not the temperature of the high voltage battery 6 is lower than a specified value T [degrees] (for example, the specified value T is set to −20 degrees Celsius) (Step S2) In Step S2, in the case where the temperature of the high voltage battery 6 is higher than the specified value T [degrees] (Step S2 is NO), the ECU 13 then determines whether or not the internal resistance of the high voltage battery 6 is larger than a specified value R [Ω] (for example, the specified value R in the case of a 144 V Ni—MH battery is set to 1 [Ω]), by means of the input/output current Abatt of the high voltage battery 6 detected by the current sensor 7, and the input/output voltage Vbatt of the high voltage battery 6 detected by the voltage sensor 8 (Step S3).

In Step S3, in the case where the internal resistance of the high voltage battery 6 is lower than the specified value R [Ω] (Step S3 is NO), the ECU 13 then determines whether or not an increase in speed of the rotation speed Nm of the propulsion motor 1 or of the rotation speed Ne of the engine 3 detected by the rotation speed sensor 2, is greater than a specified value Nb [rotation/s$^2$] (for example, the specified value Nb is set to 500 rpm per 0.1 [second]) (Step S4).

Moreover, in Step S4, in the case where the increase in speed of the rotation speed Nm of the propulsion motor 1, or of the rotation speed Ne of the engine 3 is less than the specified value Nb [rotation/s$^2$] (Step S4 is NO), it is determined whether or not the change amount (this is the absolute value of the change trend) of the input/output voltage Vbatt of the high voltage battery 6 detected by the voltage sensor 8, is greater than a specified value Vb [V/s$^2$] (for example, the specified value Vb is set to an absolute value of a change trend of +3 [V] for each 0.1 [second], or of −3 [V] for each 0.1 [second], that is, 3 [V] for each 0.1 [second]) (Step S5).

In Step S5, in the case where the change amount of the input/output voltage Vbatt of the high voltage battery 6 is lower than the specified value Vb [V/s$^2$] (Step S5 is NO), it is determined whether or not the change amount of the accelerator pedal operating amount Ap is greater than a specified value Aps [%/s] (for example, the specified value Aps is set to 20 [%] for each 0.1 [second], a fully closed state for 0 [%], and a fully open state for 80 [%]) (Step S6)

Figure 3:
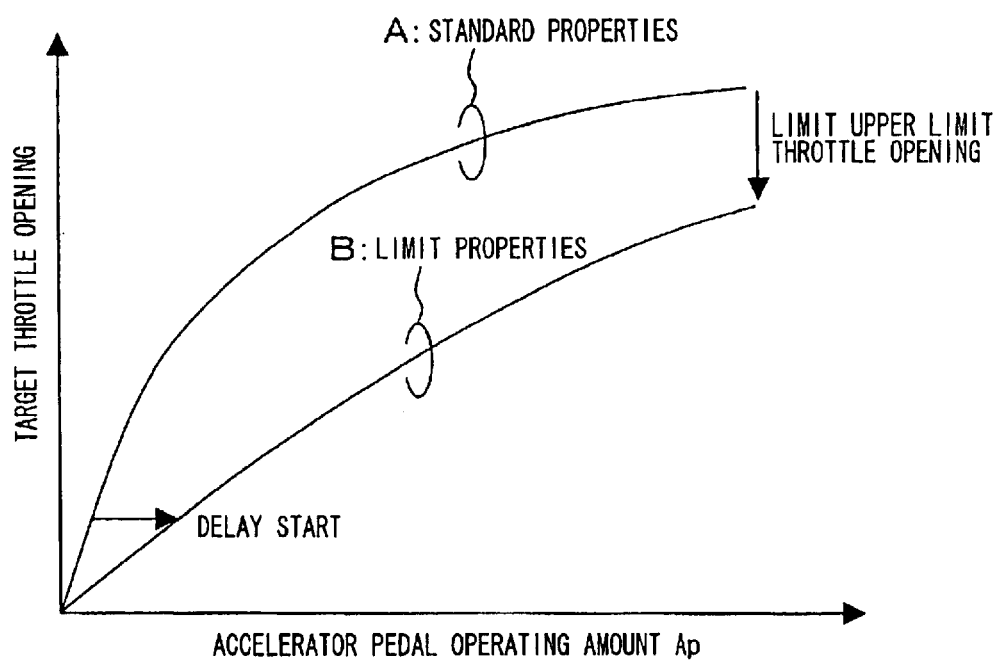
FIG. 3 is a diagram showing an accelerator pedal operating amount versus target throttle opening properties used for the battery protection operation by means of the control apparatus for a hybrid vehicle of the same embodiment.

In Step S6, in the case where the change amount of the accelerator pedal operating amount Ap is less than the specified value Aps [%/s] (Step S6 is NO), the ECU 13 executes a standard DBW control based on, as shown in FIG. 3, a standard property A of the accelerator pedal operating amount versus target throttle opening properties (Step S7), and the battery protection operation is completed.

Also in Step S1, in the case where the current vehicle driving speed is not zero (Step S1 is NO), the flow proceeds to Step S7, and the ECU 13 executes a standard DBW control based on, as shown in FIG. 3, the standard property A of the accelerator pedal operating amount versus target throttle opening properties (Step S7), and the battery protection operation is completed.

On the other hand, in any of the cases such as where in step S2 the temperature of the high voltage battery 6 is lower than the specified value T [degrees] (Step S2 is YES), or where in step S3 the internal resistance of the high voltage battery 6 is greater than the specified value R [Ω] (Step S3 is YES), or where in step S4 the increase in speed of the rotation speed Nm of the propulsion motor 1 or of the rotation speed Ne of the engine 3 is greater than the specified value Nb [speed/s$^2$] (Step S4 is YES), or where in step S5 the change amount of the input/output voltage Vbatt of the high voltage battery 6 is greater than the specified value Vb [V/s$^2$] (Step S5 is YES), or where in step S6 the change amount of the accelerator pedal operating amount Ap is greater than the specified value Aps [%/s] (Step S6 is YES), the ECU 13 delays more than for standard control, the response characteristic of the throttle opening TH with respect to the accelerator pedal operating amount, based on, as shown in FIG. 3, limit properties B of the accelerator pedal operating amount versus the target throttle opening properties, and executes DBW control with the upper limit value limited (Step S8), and completes the battery protection operation.

The limit properties B of the accelerator pedal operating amount versus the target throttle opening properties, as shown in FIG. 3, delays the start with respect to the accelerator pedal operation amount Ap more than for the response characteristic of the standard properties A, and creates a characteristic where the upper limit throttle opening of the standard characteristic A is limited.

Also, in the above embodiment, an example has been described in which it is decided whether or not to perform the battery protection operation based on the limit properties B of the accelerator pedal operating amount versus the target throttle opening properties, by determining whether or not the driving speed of the vehicle is zero. However, it is also possible to fix a specified value for the driving speed of the vehicle, and to decide whether or not to perform the battery protection operation by judging whether or not the driving speed of the vehicle is lower than the specified value. Specifically, when the driving speed of the vehicle is lower than the specified value, or if any one of the conditions from Step S2 to Step S5 above are satisfied, the battery protection operation based on the limit properties B of the accelerator pedal operating amount versus the target throttle opening properties is performed.

The device which stores the power to drive the propulsion motor 1 is not limited to the high voltage battery 6, and it is possible to use any energy storage device including a capacitor, which is capable of storing DC power. Similarly, the device which supplies low voltage DC power to the auxiliary equipment 14 of the low voltage drive is not limited to the low voltage battery 12, and it is possible to use any energy storage device including a capacitor, which is capable of storing DC power.

As described above, according to the embodiment of a control apparatus for a hybrid vehicle of the present invention, in a control apparatus for a hybrid vehicle provided with the ECU 13 which includes the throttle opening control device which electrically controls the opening of the throttle depending on the operation amount of the accelerator pedal, and the high voltage battery 6 which charges and discharges power accompanying drive or regeneration of the propulsion motor 1, and in which drive is possible by at least one of the engine 3 and the propulsion motor 1, the ECU 13, in the case where with the current driving speed of the vehicle at zero, and either; the temperature of the high voltage battery 6 is lower than a specified value, or the internal resistance of the high voltage battery 6 is greater than a specified value, or an increase in speed of the rotation speed of the propulsion motor 1 or the rotation speed of the engine 3 is greater than a specified value, or a change amount of the input/output power voltage of the high voltage battery 6 is greater than a specified value, or a change amount of the accelerator pedal operating amount is greater than a specified value, then based on the limit properties B of the accelerator pedal operating amount versus the target throttle opening properties as shown in FIG. 3, delays the response characteristic of the throttle opening TH with respect to the accelerator pedal operating amount Ap more than for the standard control, and also performs DBW control in which the upper limit value thereof is limited.

Accordingly, with control by means of a battery protection operation according to the embodiment of the present invention, the throttle opening TH and the engine rotation speed Ne change together slowly with respect to an abrupt operation of the accelerator pedal. Therefore, a rapid increase of the rotation speed of the engine 3 is suppressed, and an effect is obtained where large fluctuations in the input/output power voltage Vbatt of the high voltage battery 6 are not produced in the power generated with the slow rotation of the engine 3, and the high voltage battery 6 can be prevented from being charged more than is necessary.

Figure 4:
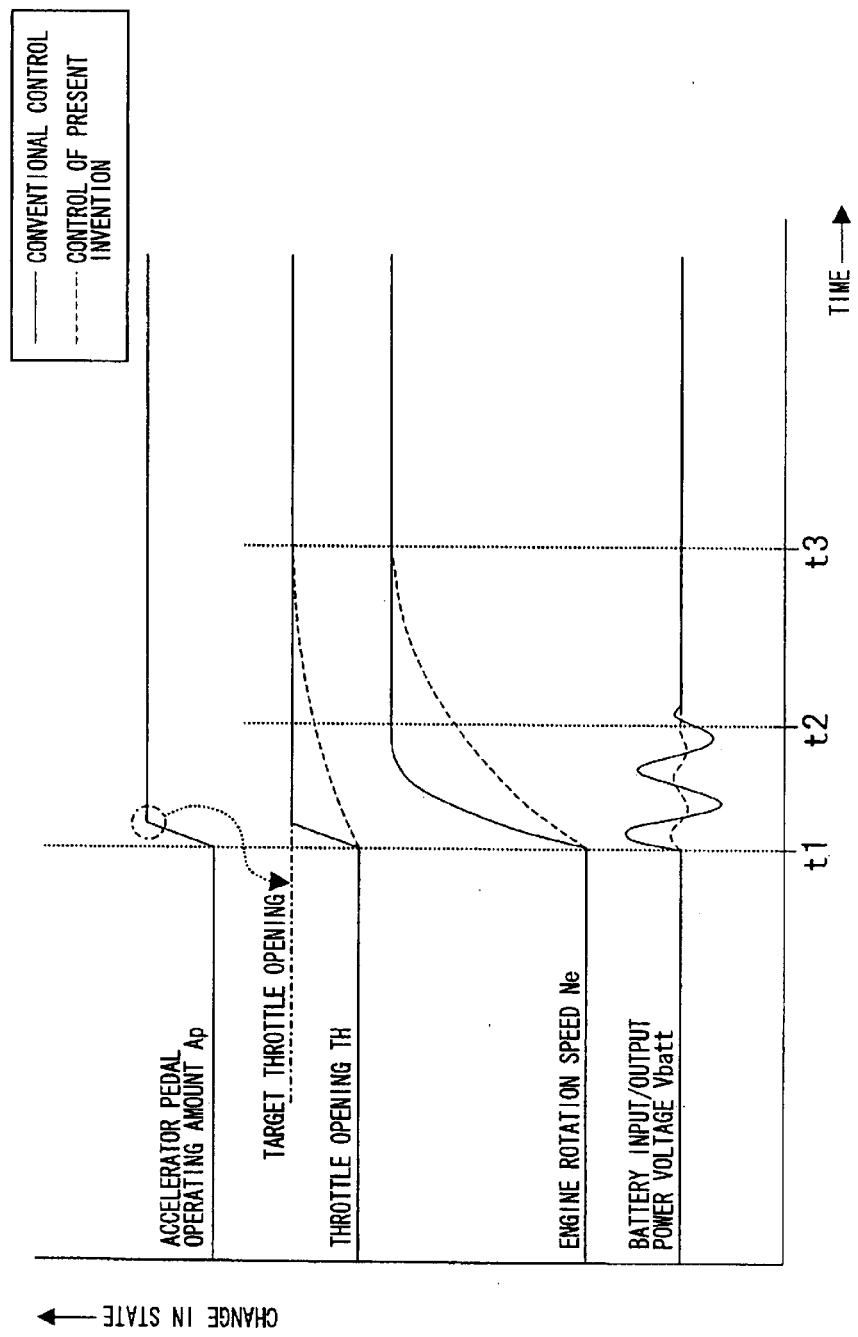
FIG. 4 is a diagram showing changes in state of each part under the battery protection operation by means of the control apparatus for a hybrid vehicle of the same embodiment.

Specifically, changes in state of each part of the battery protection operation in the present embodiment will be described with reference to the drawings. FIG. 4 is a diagram showing changes in state of each part under the battery protection operation by means of the control apparatus for a hybrid vehicle of the present embodiment, in terms of time on the horizontal axis.

As shown in FIG. 4, for example when the vehicle is stopped and the engine 3 is idling, then at time tl, when for example the driver of the vehicle operates the accelerator pedal, the throttle opening TH is controlled to a target throttle opening depending on the accelerator pedal operation change amount $\Delta Ap$. Consequently, when the accelerator pedal operation amount Ap changes abruptly, the throttle opening TH also changes abruptly. Accompanying this, in a conventional control method, the throttle opening TH and the engine rotation speed Ne change together abruptly, following the accelerator pedal operation amount Ap. Therefore, by means of power generated accompanying abrupt rotation of the engine 3, a large fluctuation is caused in the input/output power voltage Vbatt of the high voltage battery 6, and there is the possibility that the high voltage battery 6 is charged more than is necessary.

On the other hand, with control according to the battery protection operation of the present embodiment, the throttle opening TH and the engine rotation speed Ne change together slowly, following the accelerator pedal operation amount Ap. Therefore, large fluctuations in the input/output power voltage Vbatt of the high voltage battery 6 are not caused in the power generated with the slow rotation of the engine 3, and the high voltage battery 6 can be prevented from being charged more than is necessary.

Furthermore, in the above description, a four-wheeled vehicle was described as an example, and the throttle operation device which regulates the throttle opening of the engine 3 was shown as an "accelerator pedal". However, the throttle operation device which regulates the throttle opening of the engine 3 may also include a throttle grip or the like for a two-wheeled vehicle.

As above, according to the control apparatus for a hybrid vehicle of the present invention, by delaying the responsiveness of the throttle opening with respect to the operation amount of the throttle operating device, in the case where the vehicle is travelling at a speed lower than a specified value, and at least one of; the temperature of the storage device, the internal resistance of the storage device, the output voltage of the storage device, the rotating speed of the engine or of the propulsion motor, and the operation change of the throttle operating means, is lower than a specified condition, it is possible to suppress an abrupt increase in engine rotation speed caused by abrupt operation of the throttle operating device.

Consequently, an effect is obtained where abrupt increases in the engine rotation speed can be suppressed, and large fluctuations in the input/output power voltage of the storage device are not produced in the power generated with slow rotation of the engine, and the storage device can be prevented from being charged more than is necessary.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle,
   wherein the hybrid vehicle comprising an engine and a propulsion motor at least one of which drives the hybrid vehicle, and a power storage device which supplies electric power for driving the propulsion motor and which is charged by electric power generated by a regeneration operation of the propulsion motor,
   the control device of the hybrid vehicle comprises:
   a throttle opening control device which electrically controls an opening of a throttle depending on an operation amount of a throttle operating device, the throttle opening control device delays the responsiveness of the throttle opening with respect to an operating amount of the throttle operating device, when the traveling speed of the hybrid vehicle is lower than a specified value, and at least one of a temperature of the storage device, an internal resistance of the storage device, an output voltage of the storage device, a rotating speed of the engine or of the propulsion motor, and an operation change of the throttle operating device is lower than a specified condition.

* * * * *